United States Patent Office 2,985,013
Patented May 23, 1961

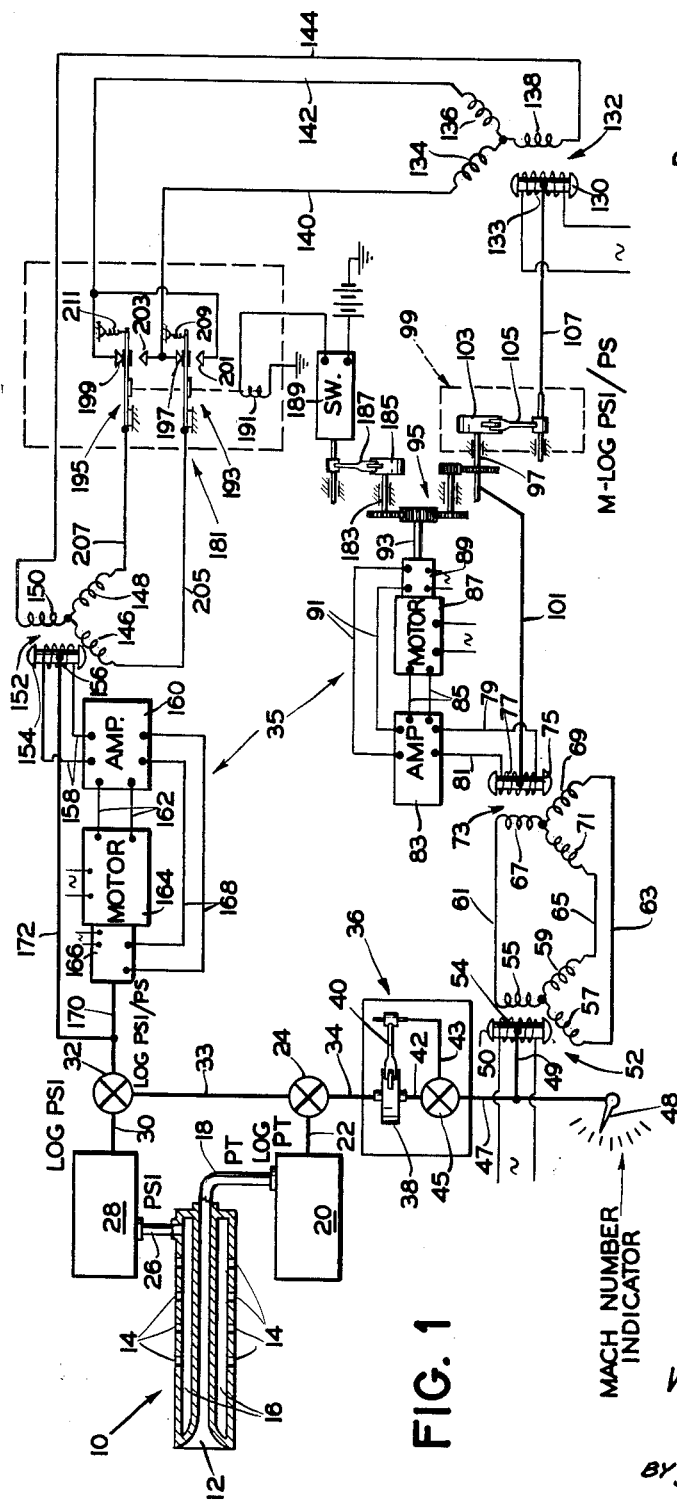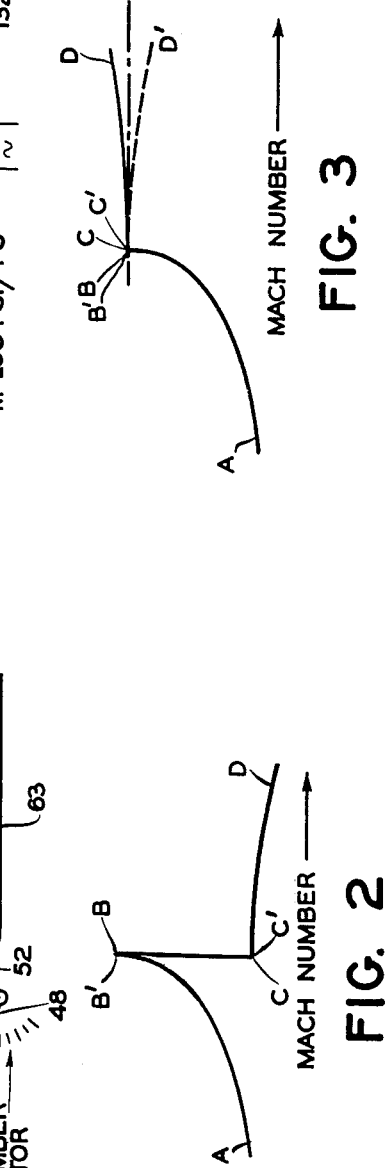

2,985,013

MEANS FOR CORRECTING ERRORS IN A PRESSURE PROBE UNDER SUPERSONIC FLIGHT CONDITIONS

William E. Yeager, Lincoln Park, and Norman Wail, Ridgefield, N.J., assignors to The Bendix Corporation, a corporation of Delaware Filed Feb. 9, 1959, Ser. No. 792,172

6 Claims. (Cl. 73—182)

The invention relates to means for correcting errors in the pressures sensed by a pressure probe under flight conditions at supersonic speeds and more particularly to the use in Air Data Computers of novel means for correcting errors in the sensing of static atmospheric pressure by a Pitot tube due to turbulences at high speeds of flight of an aircraft and under which conditions as the speed of the aircraft increases there is an increase due to such turbulence in the static pressure as sensed by the Pitot tube until, as the speed of the aircraft passes through the sound barrier, there is a sharp drop in the sensed static pressure and thereafter as the speed of the aircraft increases further there is a change in the static atmospheric pressure as sensed through the Pitot tube.

The means heretofore used for correcting for those errors encountered in the sensed static atmospheric pressure at increasing speeds has included some form of cam mechanism to provide the required correction functions to solve the problem at airspeeds below that of the speed of sound. In present day aircraft flying at supersonic speeds, there has been found a sharp drop in the sensed static pressure as soon as the speed of the aircraft passes through the sound barrier so that to provide a correction cam to give the required correction functions at speeds in excess of the speed of sound was found to be impractical to maintain the high degree of accuracies required, because of the steep slope required at the crucial point at which the speed of the plane exceeds that of the speed of sound. Thus, in order to provide a cam to effect the required correction function would mean that the cam be cut with an infinite slope to be traversed by the follower in an infinitesimal time. While attempts have been made to cut a cam approximating this function, it has been found that this could not be done with the required degree of accuracy.

An object of the invention is to provide novel means to provide a correction of the errors in the sensed static pressure probe as a function of Mach number.

Another object of the invention is to provide novel means to effect the desired correction function by providing a cam cut to a predetermined curve and accomplishing the steep portion of the required correction function by utilizing a relay mechanism and control means therefor actuated at a required point on the curve as cut in the cam so that the relay mechanism reverses operating connections of a synchro control system to effect the required steep slope correction function through a servo motor controlled thereby and effecting through a controlled output of the servo motor the desired correction function with the required accuracy.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

In the drawings:

Figure 1 is a diagrammatic showing of a computer system in which one form of the invention is embodied.

Figure 2 is a graphic illustration showing by a line A to B the correction required in the sensed static atmospheric pressure which may exceed the true static atmospheric pressure as the Mach number of the aircraft increases to approximately the speed of sound; further by a line B to C there is shown the correction required as the Mach number of the aircraft passes through the sound barrier; and by a line C to D there is shown the correction required in the sensed static atmospheric pressure which may decrease below the true static atmospheric pressure as the Mach number of the aircraft increases beyond the speed of sound. The required correction will be dependent upon the error characteristics of the particular pressure probe.

Figure 3 is a graphic illustration of the correction function effected by the cam indicated diagrammatically in Figure 1 by the numeral 103 and in which the required steep correction slope B to C, shown graphically in Figure 2, is put into the cam output by effecting operation of a relay mechanism for reversing operating connections of a synchro control system at a point B' immediately preceding point B so that a servo motor controlled by the synchro control system may differentially drive a controlled output to effect the required correction functions.

Referring to the drawing of Figure 1, there is indicated generally by the numeral 10 an air pressure probe of conventional type such as a Pitot tube which may be in the free air stream and mounted on the airfoil of an aircraft so as to sense through the passage 12 impact or total pressure which increases with the speed of the aircraft and which total pressure is hereinafter indicated by the symbol PT.

The static atmospheric pressure is further sensed through passages 14 in the side of the Pitot tube 10 and leading to a passage 16. Due to the effects of turbulence at high speeds of the aircraft, the pressure sensed through the passages 14 and 16 or the indicated pressure varies with the Mach number of the aircraft, as shown graphically in Figure 2. The sensed static atmospheric pressure, or indicated static pressure, is designated hereinafter as pressure PSI while the actual or corrected static atmospheric pressure is designated hereinafter as PS.

As shown in Figure 1, the pressure PT is applied through a conduit 18 to a pressure sensing mechanism 20, which may be of a suitable type such as shown, for example, in U.S. application Serial No. 704,403, now Patent No. 2,945,995, filed December 23, 1957, by Norman Wail and assigned to Bendix Aviation Corporation. In the mechanism 20 there is provided means for driving in response to the sensed pressure PT an output shaft 22 leading to a suitable differential mechanism indicated diagrammatically in Figure 1 by the numeral 24.

This mechanism 20 includes a pressure sensitive diaphragm giving a displacement proportional to the log of its sensed pressure and operating through a servo follow-up mechanism to effect a positioning of the output shaft 22 as a function of the log of its sensed pressure PT.

Further, the pressure PSI sensed in the chamber 16 is applied through a conduit 26 to a suitable pressure sensing mechanism 28 such as shown, for example, in the U.S. application Serial No. 704,403, now Patent No. 2,945,995.

This mechanism 28 includes a pressure sensitive diaphragm giving a displacement proportional to the log of its sensed pressure and operating through a servo follow-up mechanism to effect a positioning of an output shaft 30 as a function of the log of its sensed pressure PSI.

The mechanism 28 is arranged to drive in response to the sensed pressure PSI the output shaft 30 leading to a suitable differential mechanism 32 which is in turn connected by a shaft 33 to the differential mechanism 24 so that the outputs of the shafts 22 and 33 driven as a function of the log of PT and the log PSI, respectively, are combined at an output shaft 34. There is further applied to the differential mechanism 32 a correction function to readjust the shaft 33 and thereby the shaft 34 for the error between the actual or corrected static atmospheric pressure PS, and the indicated static pressure PSI, as sensed at the mechanism 28. The correction function is applied through a correction function loop mechanism 35, as hereinafter explained.

The output shaft 34 drives a cam mechanism indicated generally by the numeral 36 and including a cam 38 and cam follower 40 for driving shafts 42 and 43 through a suitable differential mechanism 45 so as to effectively actuate an output shaft 47 as a function of Mach number.

The shaft 47 drives a suitable Mach number indicator 48 or other controlled mechanism, not shown, and through a shaft 49 of the correction function mechanism 35, a rotor member 50 of a signal transmitter synchro indicated generally by the numeral 52. The rotor member 50 has a rotor winding 54 of conventional type connected across a suitable source of alternating current and inductively coupled to stator windings 55, 57 and 59 of the synchro 52.

The stator windings 55, 57 and 59 are in turn connected through conductors 61, 63 and 65 to corresponding stator windings 67, 69 and 71 of a signal receiver synchro 73 having a rotor member 75 and a rotor winding 77 inductively coupled to the stator windings 67, 69 and 71. The rotor winding 77 has output conductors 79 and 81 connected to the input of an amplifier 83 of conventional type and having output conductors 85 leading to a reversible two phase motor of conventional type indicated by the numeral 87 driving in turn a conventional rate generator 89 applying an anti-hunting signal through feed-back conductors 91 to the input of the amplifier 83 in a conventional manner.

Motor 87 also drives an output shaft 93 which is connected through a conventional gear train 95 and a shaft 97 to an output correction cam mechanism indicated generally by the numeral 99, which will be hereafter explained, and through the shaft 97 to a follow-up shaft 101 to reposition the rotor number 75 of the synchro 73 to a null position relative to the stator windings 67, 69 and 71 of the synchro 73 so that the rotor member 75 of the signal receiver synchro 73 effectively follows the adjusted position of the rotor member 50 of the signal transmitter synchro 52.

As indicated graphically by Figure 2, the static atmospheric pressure as sensed through the probe 10 varies with the Mach number of the aircraft. In order to correct for this phenomena the output correction cam mechanism 99 includes a cam member 103 and cam follower 105 driving through a shaft 107 a rotor element 130 of a signal transmitter synchro 132. The rotor element 130 has a winding 133 energized from a suitable source of alternating current and inductively coupled to stator windings 134, 136 and 138 of the synchro 132. The stator windings 134, 136 and 138, as shown in Figure 1, are connected by conductors 140, 142 and 144 through a suitable relay mechanism, hereinafter described, to stator windings 146, 148 and 150 of a signal receiver synchro 152 having a rotor element 154 with winding 156 to which stator windings 146, 148 and 150 are inductively coupled.

The rotor winding 156 has output conductors 158 leading to the input of an amplifier 160 of conventional type and including output conductors 162 leading to a suitable servo motor 164 in turn driving a conventional rate generator 166 applying an anti-hunting signal through feedback conductors 168 to the input of the amplifier 160 in a conventional manner.

The motor 164 drives through an output shaft 170 a follow-up shaft 172 to position the rotor element 154 of the synchro 152 to a null position so that the rotor element 154 of the signal receiver synchro 152 follows the adjusted position of the rotor element 130 of the signal transmitter synchro 132. The shaft 170 is drivingly connected to the differential mechanism 32 so as to correct the adjusted position of the shaft 33 for the initial error arising due to the positioning of the shaft 30 in response to the sensed static atmospheric pressure PSI at the prevailing Mach number of the aircraft, as distinguished from the corrected or actual static atmospheric pressure PS.

Thus the shaft 170 is driven so as to provide the correction function, illustrated graphically in Figure 2, required to correct for the errors in the sensed atmospheric pressure at aircraft speeds below the speed of sound and to effect in part the required correction function at speeds in excess of the speed of sound in cooperation with other mechanism hereinafter described.

In aircraft flight, there exists a problem in the correcting of those errors in the pressure probe due to the difference between the sensed indicated pressure PSI and the actual or corrected static atmospheric pressure PS. This correction is usually accomplished with a knowledge of the errors as a function of Mach number and correcting the errors by some means in a computer. The means of correcting these errors at aircraft speeds below supersonic speeds is usually done by having a cam surface cut to provide the required corrective function. In the transition to supersonic speeds, however, there is encountered many problems in the cutting of the cam to provide the required corrective function, since in the present day aircraft flying at supersonic speeds, there is encountered a sharp drop in the sensed indicated static pressure PSI as soon as the aircraft passes through the sound barrier. The required correction function at speeds above and below that of the speed of sound is shown graphically in Figure 2.

It will be seen then that in order to cut the correction cam 103 so as to provide the required correction function to meet the conditions, shown in Figure 2, for aircraft speeds both below and above the speed of sound would be practically impossible as the cam must necessarily have some errors in it, because of the steep slope (drop in function), as shown in Figure 2. Thus, to cut the cam so as to provide the required correction function, shown in Figure 2, would require that the cam 103 be cut with an infinite slope to be traversed by the follower 105 in an infinitesimal time. Moreover, attempts to cut a cam 103 so as to approximate this function have heretofore not been done with any degree of accuracy.

In order to provide the desired function with the required accuracy, the novel means herein disclosed has been devised wherein the cam 103 has been cut, as shown in Figure 3, while the step portion of the required correction function, shown in Figure 2 is accomplished by utilizing a relay mechanism indicated generally by the numeral 181 and actuated at the required point B' of Figures 2 and 3 to reverse the signal transmitting conductors 140 and 142 leading from the signal transmitter synchro 132 to the signal receiver synchro 152 so that a "step input" is added algebraically at the differential mechanism 32 by the servo motor 164 in positioning the shaft 170 in response to the control effect of the synchros 132 and 152 so as to provide the required correction function B—C of Figure 2 to the output shaft 33 of the differential mechanism 32.

As shown in the drawing of Figure 1, the motor 87 further drives through the gear train 95, a shaft 183 and thereby a switch control cam 185 in timed relation with the cam 103. The switch control cam 185 is arranged so as to effect through a cam follower 187 actuation of a switch mechanism 189 at a point corresponding to that of point B', shown in Figures 2 and 3. The point B' immediately precedes the point B corresponding to that at which the speed of the aircraft exceeds the speed of sound. Thus, at a point corresponding to the point B', the controlling cam 185 causes actuation of the switch 189 in a sense to effectively energize control winding 191 of the relay mechanism 181 to actuate relay switch arms 193 and 195 so as to open contacts 197 and 199 and close contacts 201 and 203, respectively.

The contacts 197 and 203 are connected to the conductor 140 while the contacts 199 and 201 are connected to the conductor 142. The switch arms 193 and 195 are connected by conductors 205 and 207, respectively, to the stator windings 146 and 148 of the signal receiver synchro 152. The switch arms 193 and 195 are normally biased by spring elements 209 and 211 upon deenergization of the relay winding 191 into engaging relation with the contacts 197 and 199, as shown, so as to connect stator winding 134 of the signal transmitter synchro 132 to stator winding 146 of the signal receiver synchro 152 and stator winding 136 of the signal transmitter synchro 132 to stator winding 148 of the signal receiver synchro 152.

However, upon energization of the relay winding 191 the switch arms 193 and 195 under the electromagnetic force of the relay winding 191 are biased so that switch arm 193 opens contact 197 and closes contact 201 while switch arm 195 opens contact 199 and closes contact 203 so as to reverse the aforenoted connections between the signal transmitter synchro 132 and the signal receiver synchro 152 and effectively connect the stator winding 134 of the signal transmitter synchro 132 to the stator winding 148.

From the foregoing, it will be seen that upon the relay winding 191 being deenergized, a displacement of the synchro rotor 130 a positive ten degrees, for example, will cause a positive ten degree error signal to be transmitted to the synchro 152. The error signal is then fed to an amplifier 160, amplified, and then used to drive a motor 164 causing the rotor 154 of the synchro to be positioned a comparable ten degrees so as to balance the error signal from the synchro 132. Thus, the displacement of the rotor 130 of the synchro 132 would be reflected as an equal and like displacement of the rotor 154 of the synchro 152.

However, upon energization of the relay winding 191, the connections of the stator windings 134 and 136 of the synchro 132 to the stator windings 146 and 148 of the synchro 152 are reversed, as heretofore explained, and the synchros 132 and 152 are now wired not back-to-back, but with the stator winding 134 of the synchro 132 going to the stator winding 148 of the synchro 152 and the stator winding 136 of the synchro 132 going to the stator winding 146 of the synchro 152.

It will be seen then that with the last-mentioned reversed synchro connections a displacement of the rotor 130 of the synchro 132 a positive ten degrees, as before, will cause the error signal fed to the amplifier 160 to be one hundred and eighty degrees out of phase with that error signal developed under the original back-to-back connections of the synchros 132 and 152. Moreover, the motor 164 under control of the reverse-connected synchros 132 and 152 will drive in a reverse direction so as to cause the rotor 154 of the synchro 152 to be positioned so as to balance the error signal from the synchro 132 by effecting a negative displacement of ten degrees to balance the positive displacement of ten degrees of the rotor 130 of the now reverse-connected synchro 132. It will be seen then that upon energization of the relay winding 191, any displacement of the rotor 130 of the synchro 132 will be accompanied by an equal, but opposite displacement of the rotor 154 of the synchro 152.

However, with the relay winding 191 deenergized any displacement of the rotor 130 of the synchro 132 will be followed by the rotor 154 of the synchro 152 both in magnitude and direction. Further, if after a ten degree positive displacement of the rotor 130 of the synchro 132, the relay winding 191 were energized the ten degree positive follow-up of the rotor 154 of the synchro 152 would be changed to a ten degree negative follow-up so that the total instantaneous (step) displacement of the rotor 154 of the synchro 152 relative to the rotor 130 of the synchro 132 would be twenty degrees. It will be seen then that from the foregoing arrangement, a step function of any desired magnitude up to a maximum of one hundred and eighty degrees may be readily obtained.

Referring to Figure 1, the gear train 95 is rotated in proportion to a function of Mach number and drives the function cam 103 and the switch actuation cam 185 to effectively control the energization and deenergization of the relay winding 191. The function cam follower 105, rotating proportional to the output of the cam 103, drives the rotor 130 of the synchro 132. Further, that portion of the required correction function labeled A to B in Figure 2 is obtained from a cam 103 cut to A to B, as shown in Figure 3. At the instant that the gear train 95 has positioned the function cam 103 to point B' of Figure 3, the switch actuating cam 185 effectively actuates the switch 189 so as to effect energization of the relay winding 191.

The energization of the relay winding 191 reverses the operating connections between synchro 132 and the synchro 152, as heretofore explained, and which is equivalent to going from point B to C in Figure 2. It might seem that in order to advance from B to D of Figure 2 would require that the cam 103 be cut to the configuration B to D' of Figure 3. However, because of the reversing of the leads from the synchro 132 to the synchro 152 effected by the energization of the relay 181 and the resulting negative electrical error signal, the cam 103 is cut to the configuration B to D of Figure 3, the mirror image of the configuration B to D' of Figure 3, to effect the required correction function.

From the foregoing it will be seen that the required portion of the required correction function of Figure 2 labeled A to B is obtained from the cam 103 having a cam surface to provide the function A to B, as shown in Figure 3. Moreover, at the instant that the gear train 95 has positioned the function cam 103 relative to the cam follower 105 to a point B' (Figure 3), the switch actuating cam 185 actuates the switch 189 so as to effect energization of the winding 191 and reverse the operative connections of the synchros 132 and 152 to cause a change in the correction function applied by the cam 103 equivalent to going from point B to point C of Figure 2. Further, to advance from a point C to point D in Figure 3 is effected by the cam 103 being cut to a configuration to provide the function C to D, as shown in Figure 3.

Moreover, it will be seen that as the speed of the aircraft reaches the point B' of Figures 2 and 3 immediately preceding the sound barrier point B and proceeds through the sound barrier the pressure PT will be increasing while the pressure PSI will be increasing up to the point B and thereafter as the speed of the aircraft passes through the sound barrier the last-mentioned sensed pressure PSI will sharply drop as indicated by the line B to C of Figure 2. The correction function applied at the differential mechanism 32 at point B' momentarily acts in a Mach number increasing sense furthering the effect of the switch control cam 185 in the operation of the control switch 189 to bring into effect the correction effect applied by the relay 181. Thereafter the control effect from the points C to D of Figure 3 is in operation to correct for the drop in the sensed pressure from points C to D of Figure 2 so long as the speed of the aircraft is above that of the speed of sound.

Upon the speed of the aircraft decreasing in an opposite sense from a speed in excess of the speed of sound to a speed below the speed of sound there is effected a reversal of the previous operation. Thus upon the adjustment of the cam 103 to a point C' relative to the cam follower 105 and immediately after the point C, there is effected a reverse operation of the switch mechanism 189 by the switch control cam 185 causing a de-energization of the relay winding and a return of the relay 181 to an operative condition in which the synchros 132 and 152 are effectively connected back-to-back, whereupon there is added to the differential mechanism 32 a correction function equivalent to going from point C to point B of Figure 2 so that thereafter at speeds of the aircraft below the speed of sound an output correction function corresponding to the line B to A is applied depending upon the prevailing speed of the aircraft below that of the speed of sound.

The correction function applied by the cam mechanism 99, relay-controlled synchros 132 and 152, and motor 164 is in either event applied through the shaft 170 to the differential mechanism 32 so as to readjust the shaft 33 for the corrected ambient atmospheric pressure at the prevailing Mach number of the aircraft.

Thus, those errors in sensed ambient atmospheric pressure at the probe 10 due to turbulent conditions prevailing at airspeeds of the aircraft above or below the speed of sound or as the speed of the aircraft passes through the sound barrier may be effectively corrected to provide a more accurate indication or control effect dependent upon the Mach number of the aircraft.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. For use with an air pressure probe positioned in the free air stream of an aircraft during flight of the aircraft at Mach numbers above and below that of the speed of sound; means for correcting for an error in a pressure sensed by the pressure probe, comprising, in combination, a cam having a first cam surface to correct for an error in said sensed pressure at a Mach number of the aircraft below the speed of sound and a second cam surface to correct for an error in said sensed pressure at a Mach number of the aircraft in excess of the speed of sound, means operatively controlled by said pressure probe for adjusting said cam as a function of the Mach number of the aircraft, cam follower means for cooperating with said first and second cam surfaces, operative connecting means including variable inductive coupling means driven by said cam follower means and effective for applying a corrective function to the means operatively controlled by said pressure probe, means for applying a step function to the operative connecting means, said step function applying means including means to change the coupling relation of said inductive coupling means, said coupling changing means being operative by said pressure probe controlled means in timed relation with said cam upon the aircraft attaining a speed of substantially Mach number one so that the corrective function applied by said cam follower means through said operative connecting means may effectively correct for the error in the sensed pressure.

2. For use with an air pressure probe positioned in the free air stream of an aircraft during flight of the aircraft at Mach numbers above and below that of the speed of sound; means for correcting for an error in a pressure sensed by the pressure probe, comprising, in combination, a cam having a first cam surface to correct for an error in said sensed pressure at a Mach number of the aircraft below the speed of sound and a second cam surface to correct for an error in said sensed pressure at a Mach number of the aircraft in excess of the speed of sound, means operatively controlled by said pressure probe for adjusting said cam as a function of the Mach number of the aircraft, cam follower means for cooperating with said first and second cam surfaces, a synchro signal transmitter having a rotor element adjustably positioned by said cam follower means, a synchro signal receiver having a rotor element, electrical conductors operably connecting the synchro signal transmitter to the synchro signal receiver in a first operative relation, a servo motor for applying a corrective function to the means operatively controlled by said pressure probe, said servo motor to adjustably position the rotor element of the synchro signal receiver, means operably connecting the rotor element of the synchro signal receiver to the servo motor so that in the first operative relation of the synchro signal receiver to the synchro signal transmitter the receiver rotor element is actuated by the servo motor so as to follow in one sense the transmitter rotor element as adjustably positioned by the cam follower means, switching means for transferring the electrical conductors so as to connect the synchro signal transmitter to the synchro signal receiver in a second operative relation, said means controlled by said pressure probe including means to operate said cam and switching means in timed relation upon the speed of the aircraft being substantially at Mach number one, said switching means being rendered operative by the means controlled by said pressure probe upon the Mach number of the aircraft exceeding the speed of sound so that in the second operative relation of the synchro signal receiver to the synchro signal transmitter the receiver rotor element is actuated by the servo motor so as to follow in an opposite sense the transmitter rotor element as adjustably positioned by the cam follower means, said servo motor being operatively controlled through said synchro signal transmitter and receiver in such a manner that the correction applied by said servo motor to the means operatively controlled by said pressure probe may effectively correct for the error in the sensed pressure.

3. For use with an air pressure probe including means for sensing total impact air pressure and means for sensing static atmospheric pressure during flight of an aircraft at Mach numbers above and below that of the speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, means operated by said pressure responsive means having output means adjustably positioned as a function of the Mach number of the aircraft, control means driven by said output means for providing a corrective function variable with the Mach number of the aircraft, synchro receiver and transmitter means for operably connecting said control means to said pressure responsive means for applying the corrective function thereto, and switch means to vary the effect of said synchro receiver and transmitter connecting means, said switch means being operated by said output means in a predetermined timed relation with said control means upon the speed of the aircraft being substantially at Mach number one so as to cause said switch means to vary the effect of the said synchro receiver and transmitter connecting means in one sense upon the Mach number of the aircraft increasing above the speed of sound and to cause said switch means to vary the effect of said synchro receiver and transmitter connecting means in another sense upon the Mach number of the aircraft decreasing below the speed of sound.

4. For use with an air pressure probe including means for sensing total impact air pressure and means for sensing static atmospheric pressure during flight of an aircraft at Mach numbers above and below that of the speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, mean operated by said pressure responsive means having output means adjustably positioned as a function of the Mach number of the aircraft, a cam driven by said output means, cam follower means cooperating with said cam for providing a corrective function variable with the Mach number of the aircraft, means for connecting said cam follower means to said pressure responsive means for applying the corrective function thereto, said connecting means including a synchro signal transmitter and receiver means, control means operably connected to said synchro signal transmitter and receiver means to vary the effect of said connecting means, actuating means for said control means operable by said output means in a predetermined timed relation with said cam follower means upon the speed of said aircraft being substantially at Mach number one so as to cause said control means to vary the effect of said connecting means in one sense upon the Mach number of said aircraft increasing above the speed of sound and to cause said motor means to vary the effect of said connecting means in another sense upon the Mach number of the aircraft decreasing below the speed of sound.

5. For use with an air pressure probe including means for sensing total impact air pressure and means for sensing static atmospheric pressure during flight of an aircraft at Mach numbers above and below that of the speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, means operated by said pressure responsive means having output means adjustably positioned as a function of the Mach number of the aircraft, a cam driven by said output means, said cam having a first cam surface to correct for the error in said sensed static atmospheric pressure at a Mach number of the aircraft below the speed of sound, said cam having a second cam surface to correct for an error in said sensed pressure at a Mach number of the aircraft in excess of the speed of sound, cam follower means cooperating with said first and second cam surfaces for providing a corrective function variable with the Mach number of the aircraft, means for operably connecting said cam follower to said pressure responsive means for applying the corrective function thereto, said connecting means including a synchro signal transmitter and receiver, control means operably connected to said synchro signal transmitter and receiver to vary the effect of said connecting means, means for selectively actuating said control means in first and second senses, said actuating means being operated by said output means in a predetermined timed relation with said cam follower upon the speed of said aircraft being substantially at Mach number one so as to actuate said control means in said first sense so as to render said connecting means effective in a sense to correct the error in the sensed static pressure upon the Mach number of the aircraft increasing above the speed of sound and to actuate said control means in said second sense so as to render said connecting means effective in a sense to correct the error in the sensed static pressure upon the Mach number of the aircraft decreasing below the speed of sound.

6. In a device of the character described, means responsive to a sensed condition differing from a second condition by a predetermined error which varies over first and second ranges of operation of the device, comprising a correction cam having a first cam surface to effectively correct the sensed condition for the error in the first range of operation, said cam having a second cam surface to effectively correct the sensed condition for the error over the second range of operation, cam follower means for cooperating with said first and second cam surfaces, operative connecting means driven by said cam follower means for applying a corrective function to said condition responsive means, said operative connecting means including variable inductive coupling means, said condition responsive means drivingly connected to said correction cam, means for applying a step function to the operative connecting means, said step function applying means including means to change the coupling relation of said inductive coupling means and means to operate said cam and step function applying means in timed relation so as to effectively apply said step function to said operative connecting means intermediate said first and second ranges of operation so that said cam follower means in cooperative relation with said first and second cam surfaces may effectively correct the predetermined error in the sensed condition over said ranges of operation.

References Cited in the file of this patent
UNITED STATES PATENTS

| 2,450,884 | Dawson et al. | Oct. 12, 1948 |
| 2,512,790 | Cleveland | June 27, 1950 |
| 2,599,288 | Schaefer | June 3, 1952 |